United States Patent
Lotfi et al.

(10) Patent No.: US 9,276,841 B2
(45) Date of Patent: Mar. 1, 2016

(54) ADAPTING NETWORK CONTROL MESSAGING FOR ANYCAST RELIANT PLATFORMS

(71) Applicant: EdgeCast Networks, Inc., Santa Monica, CA (US)

(72) Inventors: Hossein Lotfi, Los Angeles, CA (US); Alexander A. Kazerani, Santa Monica, CA (US)

(73) Assignee: EDGECAST NETWORKS, INC., Santa Monica, CA (US)

( * ) Notice: Subject to any disclaimer, the term of this patent is extended or adjusted under 35 U.S.C. 154(b) by 214 days.

(21) Appl. No.: 14/170,002

(22) Filed: Jan. 31, 2014

(65) Prior Publication Data
US 2015/0222528 A1    Aug. 6, 2015

(51) Int. Cl.
*G06F 15/16* (2006.01)
*H04L 12/721* (2013.01)
*H04L 29/08* (2006.01)

(52) U.S. Cl.
CPC ............. *H04L 45/38* (2013.01); *H04L 67/14* (2013.01)

(58) Field of Classification Search
None
See application file for complete search history.

*Primary Examiner* — Brian P Whipple

(57) ABSTRACT

Some embodiments set forth a control message header rewriting methodology. Incoming packets are inspected to identify control messages. Each control message is then inspected to determine whether it originates from a client engaged in a session with a server or from an intermediary node along the path connecting the client and the server. The determination is predicated on a comparison of the addressing provided in the control message header and the addressing provided in the offending packet header, wherein the offending packet is the packet that triggers the intermediary node to issue the control message. If the addressing differs, the header addressing of control message is rewritten using the header addressing of the offending packet. Otherwise, a session table lookup is performed to identify which session the control message is directed to based in part on a hash of the control message header addressing.

20 Claims, 8 Drawing Sheets

ADAPTING NETWORK CONTROL MESSAGING FOR ANYCAST RELIANT PLATFORMS

TECHNICAL FIELD

The present invention relates to Anycast routing and network control messaging for platforms reliant on Anycast routing.

BACKGROUND ART

Anycast is a network addressing and routing methodology for routing packets from a sender to the closest of several potential recipients that are each identified with the same address. Anycast is built upon the Border Gateway Protocol (BGP). BGP advertisements announce that the same address is available at different topological locations throughout a network (i.e., Internet). Routers receiving the advertisements continually cull their routing tables to identify the shortest path to one such Anycast destination.

Anycast lends itself for use with a distributed platform. A distributed platform operates a plurality of geographically distributed points-of-presence (PoPs) for the purpose of serving content or providing services from each of those PoPs to users that are closest to the PoPs. Each PoP typically includes at least two collocated servers. The multiple servers of a given PoP host the same or different content and/or perform the same or different services. This ensures that the PoP has adequate resources for serving the content or for providing the various services while also ensuring redundancy and balanced load distribution across the PoP.

By using Anycast in combination with such a distributed platform, user requests for content or services can be routed to the distributed platform PoP that is closest to the requesting user. In so doing, the Anycast identified PoP can deliver the content or services in an optimal manner in part because of the proximity to the user. For example, a user experiences less latency and packet loss when receiving content from a proximate Anycast identified PoP than other more distant servers or PoPs. A content delivery network (CDN) is an example of a distributed platform that benefits from the routing efficiencies of Anycast.

However, some legacy routing and control mechanisms of underlying networking protocols were never designed to work with such Anycast reliant distributed platforms. As a result, aberrant behavior may occur in these Anycast reliant distributed platforms, but not in traditional Unicast, Broadcast, or Multicast reliant distributed platforms.

FIG. 1 provides an exemplary case of legacy control messaging producing aberrant behavior in an Anycast reliant distributed platform. FIG. 1 presents a message exchange between a client 110 and an Anycast identified PoP 120 of the distributed platform, wherein the aberrant behavior results from a control message that is issued by an intermediary node 115 in the path connecting the client 110 to the PoP 120. The PoP 120 includes a core router 125, at least two directors 130 and 135 and a set of two servers 140 and 145, though the same aberrant behavior would be observed if the PoP 120 was horizontally or vertically scaled.

The message exchange commences with the client 110 submitting (at 150) a request for content to an Anycast address of the distributed platform. Anycast routing delivers the request to the PoP 120 and more specifically, to the core router 125. The core router 125 performs a simple hash of the source and destination addresses specified in the request header to select director 130 to process the request. The core router 125 then forwards (at 155) the request to the selected director 130.

The director 130 is tasked with selecting (at 160) a server from the set of servers 140 and 145 to respond to the user request. The director 130 first performs a session table lookup to determine if a prior session is established for the request and if a server has already been selected to handle the session. In this case, no prior session exists and the director 130 selects server 140 based on a hash of the name and/or path of the content specified in the request and/or addressing information from the request header. The director 125 creates a session table entry such that future inbound packets from the client 110 that are associated with the session are properly routed to the correct server 140. The session is identified by a source and destination address combination, wherein the term address refers to any one or more of a Media Access Control (MAC) address, Internet Protocol (IP) address, and application or transport layer protocol port number. In this example, the session table entry identifies the current session with a source IP address and source port pair and a destination IP address and destination port pair. After creating the session, the director forwards (at 165) the request to the selected server 140.

The server 140 processes the request and begins serving (at 170) the requested content to the client 110 in response. However, the intermediary node 115 in the connection between the client 110 and the server 140 submits (at 175) a control message back to the Anycast address specified by the original request. Control messages can be used for a variety of reasons. For the current example, the control message indicates that the intermediary node 115 cannot support the manner in which the server 140 sends the content. One such control message indicates that the intermediary node 115 does not support packets of the size submitted by the server 140 and that the server 140 should retransmit the packets with a smaller size. Such a control message can be an Internet Control Message Protocol (ICMP) message indicating that the packet(s) exceeds the maximum transmit unit (MTU) supported by the intermediary node 115. It is significant to note that the source address of the control message is the address of the intermediary node 115 and not the address of the client 110. Also, in some instances, the destination address of the control message may identify the Anycast address and not the unique IP address for the actual server 140 within the PoP 120 that transmits the offending packets that cause the intermediary node 115 to issue the control messages.

Upon receiving the control message, the core router 125 may select (at 180) an incorrect director that has no knowledge of the client's 110 active session (i.e., director 135) as the selection is based on a hash of the intermediary node 115 address that is provided in the control message header rather than the client 110 address. If the control message is passed from the core router 125 to director 135 (i.e., the incorrect director), the director 135 will be unable to identify the server 140 or the session to which the control message relates. Specifically, the session table maintained by director 135 will not have any entry for the address combination in the control message header, and will also lack any entry for the address combination used to identify the session created by director 130. Even if the core router 125 forwards the control message to the correct director 130, the director 130 will still be unable to identify the server 140 or the session to which the control message relates as the director's session table will not have any entries for the addressing that is provided in the control message header. Consequently, there is no guarantee that the control message will arrive at the appropriate server 140 that is handling the session. Until the control message arrives at the server 140, the server 140 continues to send the offending packets and the intermediary node 115 continues to block or drop those packets, thus preventing the client 110 from receiving the requested content.

The above depicts one scenario where aberrant behavior results from legacy control mechanisms in an Anycast reliant distributed platform. Similar aberrant behavior is observed in PoPs, clusters, or service regions of Anycast reliant distributed platforms having different architectures. Also, the aberrant behavior is observed when different control messages besides the exemplary case described above are issued by intermediary nodes. Accordingly, there is a need to resolve these and other aberrant behavior occurring within Anycast reliant distributed platforms. More specifically, there is a need to adapt legacy control mechanisms and control messages for Anycast reliant distributed platforms.

SUMMARY OF THE INVENTION

It is an objective to resolve various aberrant behaviors that occur from the application of legacy control mechanisms and control messaging to Anycast reliant distributed platforms. One specific aberrant behavior that is addressed by the embodiments herein is ensuring that a control message originated by an intermediary node in a path connecting a client to an Anycast identified point-of-presence (PoP) having several servers is forwarded to the proper server of the PoP.

To achieve these and other objectives, some embodiments set forth a control message header rewriting methodology. The methodology is implemented by one or more machines operating in the Anycast identified PoP, such as the PoP directors or load balancers. As part of the methodology, each director inspects incoming packets to identify control messaging from other messaging or packets. For each identified control message, the control message is inspected to determine whether it originates from a client that is engaged in an active session or connection with the PoP or from an intermediary node along the path connecting the client and the PoP. The determination is predicated on a comparison of the addressing provided in the control message header and the addressing provided in the offending packet header, wherein the offending packet is the packet that triggers the intermediary node to issue the control message, and wherein the control message typically includes at least the header of the offending packet in its payload. If the addressing of the control message header differs from that of the embedded offending packet header, the director determines that the control message is sent from an intermediary node. In such cases, the director rewrites the header addressing of control message. Specifically, the control message header is rewritten by replacing the source address identifying the intermediary node with the destination address from the offending packet header identifying the client. Thereafter, the control message can be passed to the correct director. The correct director then performs a session table query using the source and destination address combination from the rewritten control message header. In so doing, the correct director identifies the session to which the control message is directed, and by extension, the correct server that is tasked with the session. The control message can then be passed to the correct server. The correct server then responds in the manner requested by the control message, allowing subsequent packets to pass through the intermediary node to the client without issue.

BRIEF DESCRIPTION OF THE DRAWINGS

In order to achieve a better understanding of the nature of the present invention, a preferred embodiment for the systems and methods performing control message header rewriting will now be described, by way of example only, with reference to the accompanying drawings in which.

DETAILED DESCRIPTION

In the following detailed description, numerous details, examples, and embodiments for the systems and methods performing the control message header rewriting are set forth and described. As one skilled in the art would understand in light of the present description, these systems and methods are not limited to the embodiments set forth, and these systems and methods may be practiced without some of the specific details and examples discussed. Also, reference is made to the accompanying figures, which illustrate specific embodiments in which the invention can be practiced. It is to be understood that other embodiments can be used and structural changes can be made without departing from the scope of the embodiments herein described.

Some embodiments set forth control message header rewriting systems and methodologies for adapting legacy control messaging for use within Anycast reliant distributed platforms. In accordance with the description provided in the background, an Anycast reliant distributed platform is any platform including two or more geographically distributed Points-of-Presence (PoPs). Each PoP includes at least two tiers of nodes and each PoP or the servers of each PoP being addressable with a common address also referred to as an Anycast address. A Content Delivery Network (CDN) is representative of one such Anycast reliant distributed platform.

Figure 1:
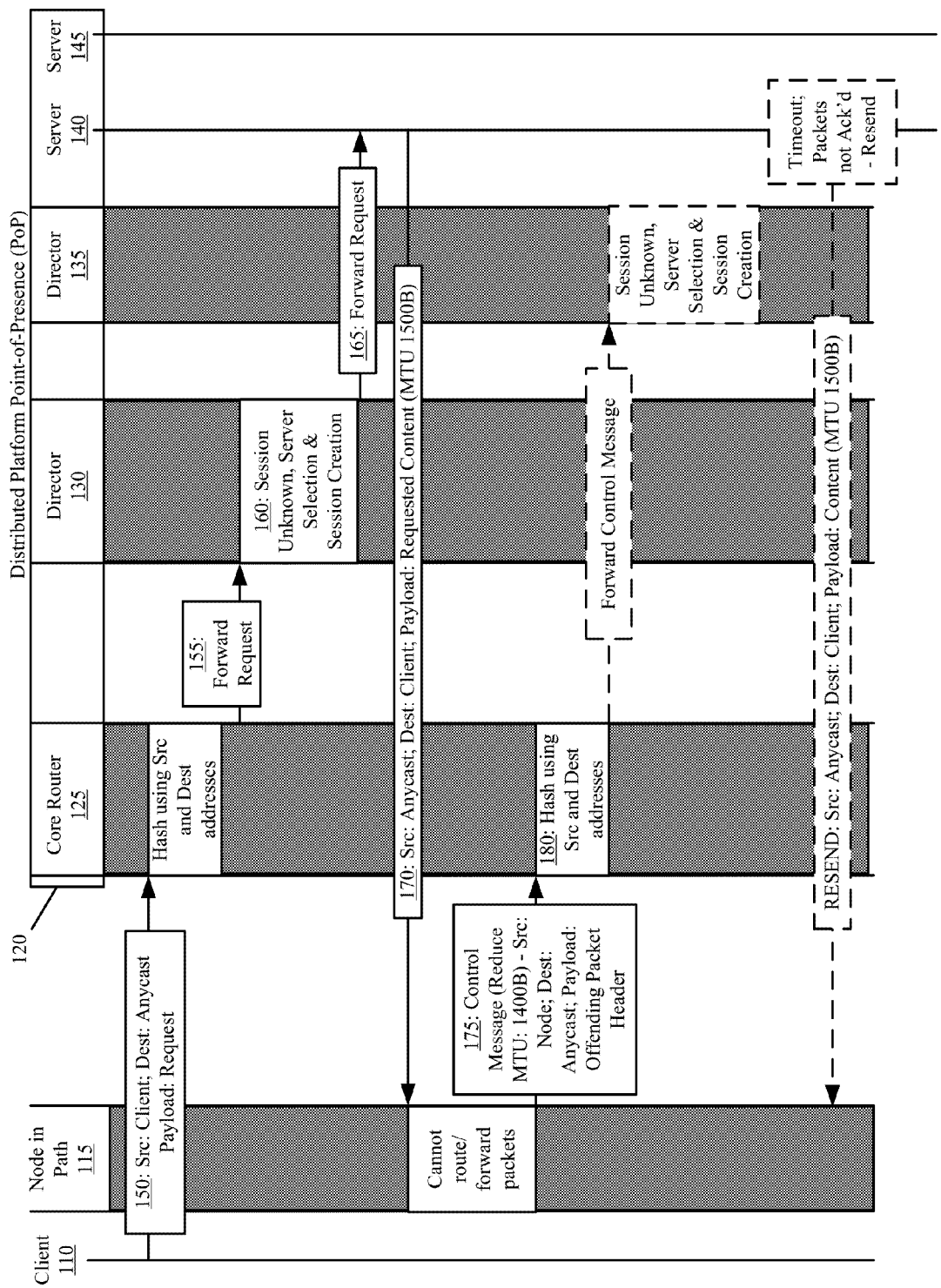
FIG. 1 provides an exemplary case of legacy control messaging producing aberrant behavior in an Anycast reliant distributed platform.
Figure 2:
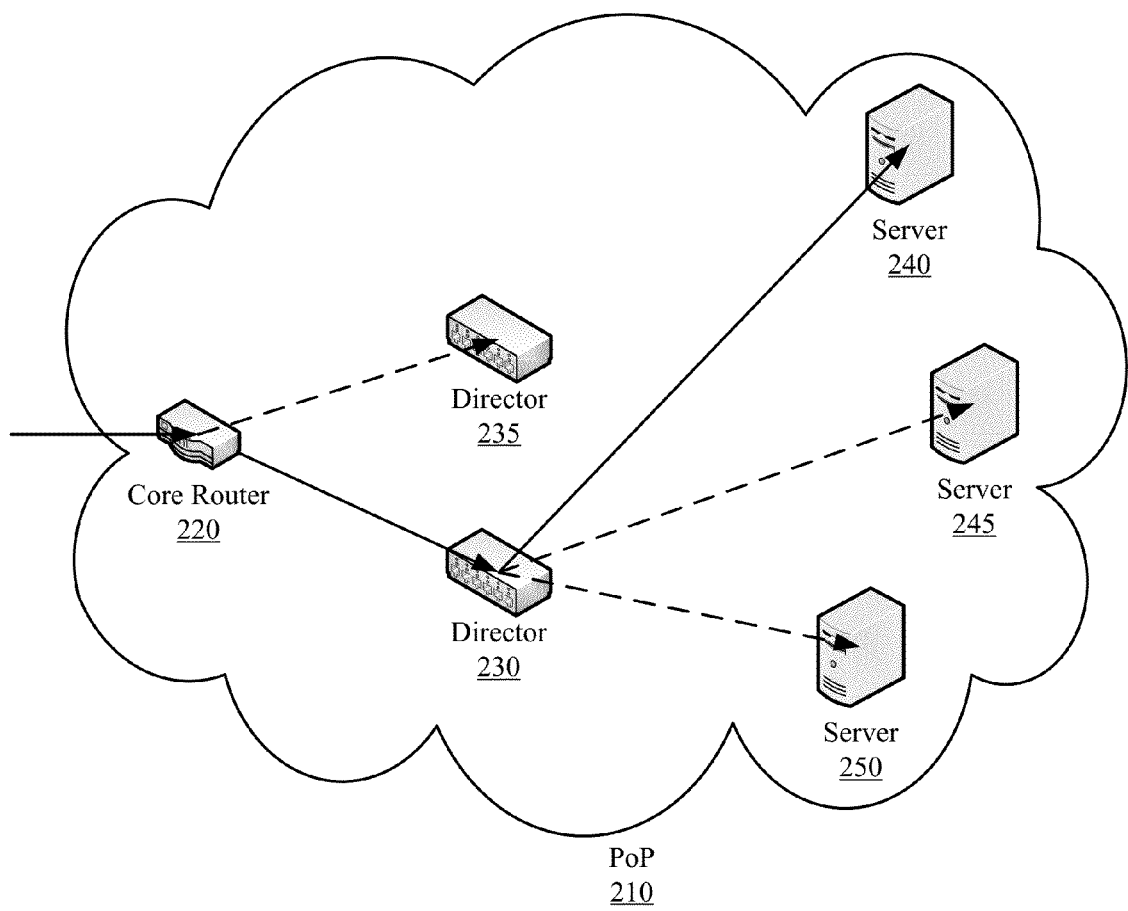
FIG. 2 illustrates an exemplary distributed platform PoP implementing the control message header rewriting of some embodiments.

FIG. 2 illustrates an exemplary distributed platform PoP 210 implementing the control message header rewriting of some embodiments. The PoP 210 includes three tiers of nodes. The first tier node is a core router 220. The second tier nodes are a pair of directors 230 and 235. The third tier nodes are three servers 240, 245, and 250. It should be noted that the control message header rewriting methodology of some embodiments is applicable even when the exemplary PoP 210 or its respective tiers are scaled vertically or horizontally. Also, the core router 220, directors 230 and 235, and servers 240, 245, and 250 may be physically separate machines or a set of virtual machines that execute over partitioned sets of resources of one or more physically separate machines as enumerated in FIG. 7.

The core router 220 is typically configured with an Anycast address that is also configured to other core routers of the distributed platform PoPs. The core router 220 advertises the Anycast address to neighboring routers. Accordingly, all incoming packets that are addressed to the Anycast address and that are routed to the PoP 210 because of Anycast routing are first received by the core router 220. In some embodiments, the core router 220 is also configured with a virtual IP address to uniquely identify the core router 220 from other nodes of the PoP 210.

The core router 220 distributes the incoming packets to the second tier of nodes, the directors 230 and 235. As such, the core router 220 performs a load balancing function. The distribution is controlled by a hash in some embodiments, though other distribution schemes may be used in other embodiments. As one example, the core router 220 distributes the incoming packets across the directors 230 and 235 based on a hash of the source and destination address of each incoming packet. As used hereafter, the term address references an Internet Protocol (IP) address, Media Access Control (MAC) address, a port number, such as a Transmission Control Protocol (TCP) port or User Datagram Protocol (UDP) port, or some combination thereof. Accordingly where reference is made to a source address, that reference implies a combination of a source IP address and source TCP port number.

The directors 230 and 235 operate to select one of the third tier nodes, servers 240, 245, and 250, to process the incoming packets. As part of this operation, each director 230 and 235 maintains a session table to track various sessions established between various clients and the servers 240, 245, 250. Each session is tracked with a specific session table entry. The entry ensures that the director forwards all packets related to a particular session to the same server in the third tier of PoP 210 nodes that was selected for that particular session when the session was created. A client request for content or a service initiates creation of a session. Once the request has been fulfilled by passing the requested content or performing the requested service to the client, the session can be closed and the corresponding entry in the session table can be removed. A session identifier identifies each session. In some embodiments, the session identifier is an IP address and port combination. In some embodiments, each session identifier for a corresponding session table entries specifies a source IP address and source port combination, a destination IP address and destination port combination, or both. It should be apparent that other session identifiers can be used in identifying sessions and the control header message rewriting methodology described below can be adapted for these different session identifiers.

The third of nodes including servers 240, 245, and 250 are tasked with responding to client requests and providing the content or the service requested by a client throughout the duration of a session with that client. The servers 240, 245, and 250 include caching servers, application servers, or some combination thereof as some examples. Caching servers host content of various content providers for the purpose of serving that content to clients or users on behalf of the content providers. Such content can be static, dynamic, or streaming. Application servers perform various services on behalf of the clients or users.

Figure 3A:
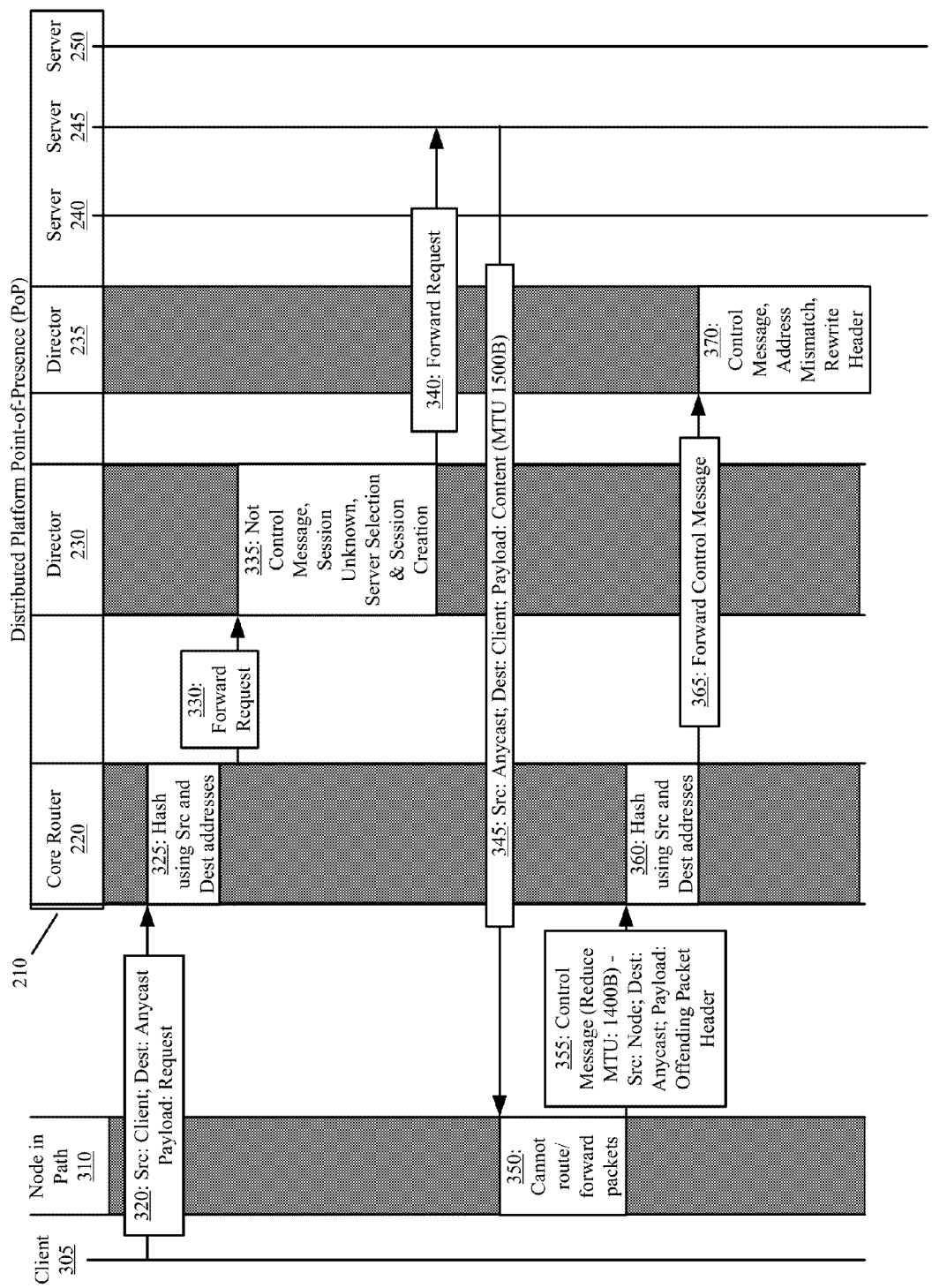
FIGS. 3A and 3B illustrate a message exchange demonstrating the control message header rewriting in accordance with some embodiments.
Figure 3B:
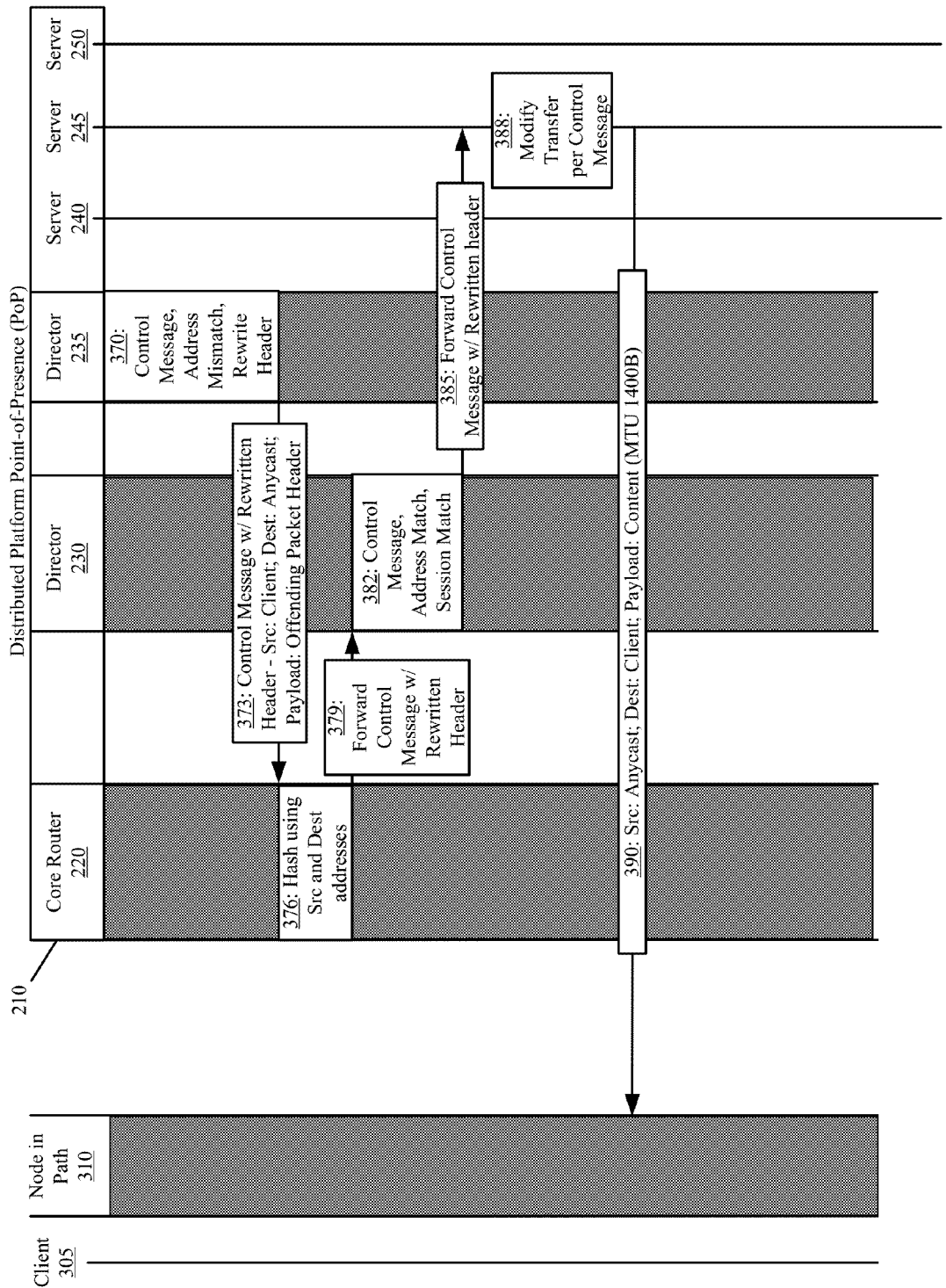

FIGS. 3A and 3B illustrate a message exchange demonstrating the control message header rewriting in accordance with some embodiments. The message exchange involves a client 305, intermediary node 310, and the nodes of PoP 210. The intermediary node 310 can be any of several nodes in the communication pathway between the client and the PoP 210. In other words, the intermediary node 310 is one of the many hops connecting the client to the PoP 210 and through which the client and the PoP 210 exchange packets, messaging, or other data. The intermediary node 310 can by any of a router, server, proxy, switch, or gateway as some examples.

The message exchange commences with the client 305 issuing (at 320) a request that is addressed to an Anycast address advertised by the core router 220. The Anycast address specified as part of the request may specify an IP address and port number combination. In this figure, the core router 220 receives the request because it is the closest node to the client 305 that advertises the Anycast address. The request can be a HyperText Transfer Protocol (HTTP) GET message with a Uniform Resource Locator (URL) specifying the content or service that is being requested.

The core router 220 hashes (at 325) the request. In some embodiments, the core router 220 hashes the source and destination IP addresses from the header of the request packet. The core router 220 then forwards (at 330) the request to director 230 based on a result of the hash.

The director 230 determines (at 335) that the request is not a control message. In some embodiments, this determination is made based on a port number specified within the packet/request header or based on the protocol used to encapsulate the packet/request. The director 230 also determines whether a session exists for the request. This determination is made by querying a session table of the director 230. In some embodiments, the query is performed using the source IP address, source port, destination IP addresses, and destination port from the request/packet header. For a new request, a session entry will not exist in the session table. Consequently, the director 230 selects one of PoP servers to forward the request to using a persistent hash such as CARP. In this figure, the director 230 forwards (at 340) the request to server 245 and creates a new session entry in the session table identifying server 245 as responsive to the address combination for this particular session.

The server 245 responds to the request by encapsulating the requested content as a set of packets and sending (at 345) the set of packets to the client 305. However, the intermediary node 310 in the transmission path connecting the client 305 to the PoP 210 detects (at 350) an issue with how the packets are formed or how the packets are being sent. The issue may prevent the intermediary node 310 from forwarding the packets further down the connection path towards the client 305. One such issue is an unsupported maximum transmission unit (MTU), whereby the server 245 sends packets of a size that is too big for the intermediary node 310 to route and the intermediary node 310 does not perform fragmentation of such packets. This issue can occur even when the server 245 generates the packets with a size supported by the intermediary node 310, but the size of the packets grow during transmission as a result of IPv6-to-IPv4 tunneling or other packet encapsulations or modifications. In response to the identified issue, the intermediary node 310 sends (at 355) a control message back to the source of the offending packet. In some embodiments, the source of the offending packet is identified based on the source address entered in the offending packet header. However, in Anycast reliance distributed platforms, the source address may not uniquely identify the server 245 that originates the offending packet when the source address is the Anycast address rather than unique IP addresses of the servers 240, 245, and 250. The control message instructs the server 245 of the issue and may also directly or indirectly specify what action is needed to resolve the issue. Continuing with the MTU example from above, the intermediary node 310 would pass an Internet Control Message Protocol (ICMP) message with the appropriate value set for the code field to indicate a packet that is too big. The ICMP message may indicate a smaller MTU that is supported by the intermediary node 310. Additionally, the ICMP includes the header of the offending packet (i.e., the packet that caused the control message to issue) per Request for Comment (RFC) 2468 and RFC 4443. It should be noted that other control messages using the same or other protocols are supported by the embodiments described herein.

Figure 4:
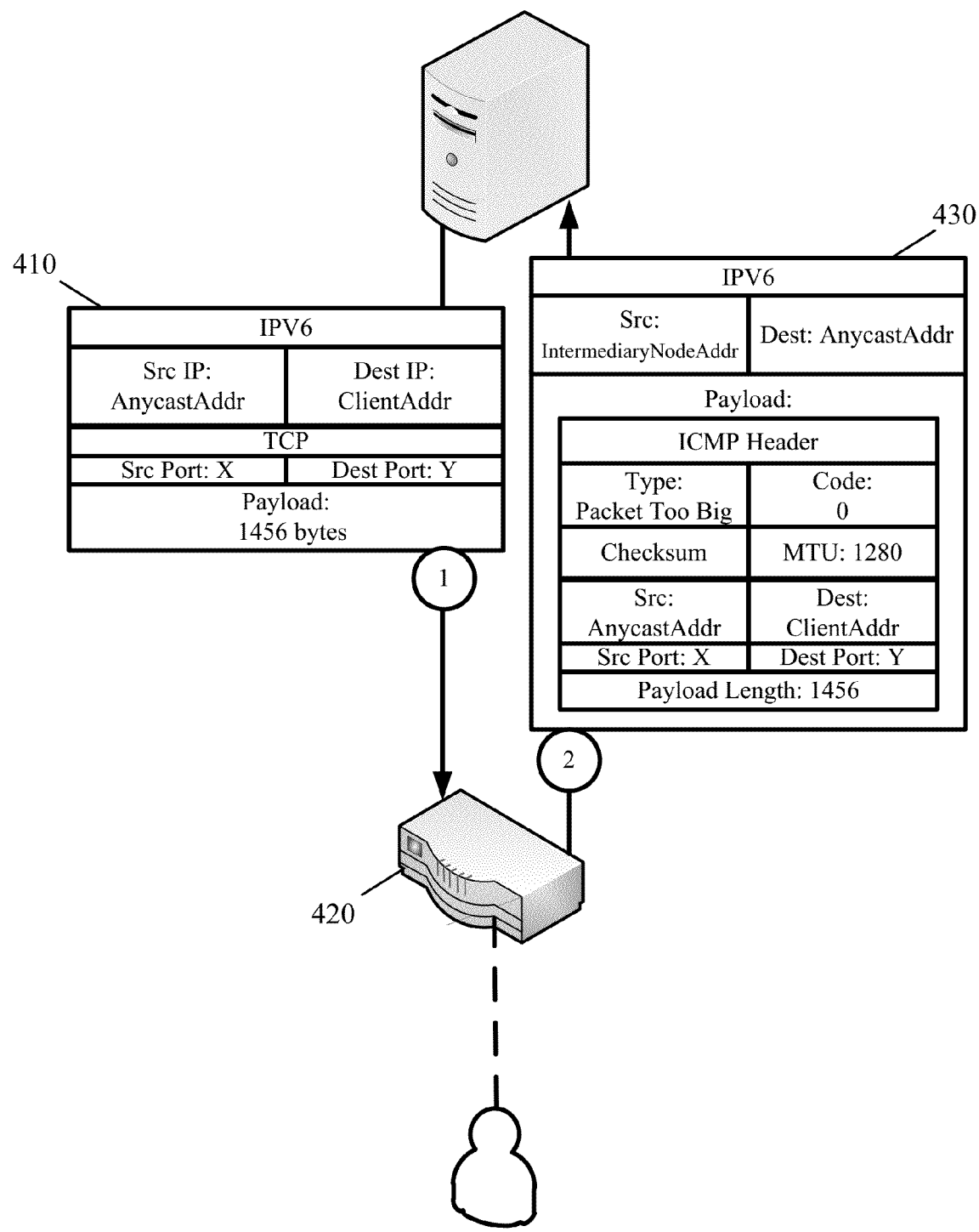
FIG. 4 illustrates an example of an offending packet being received at an intermediary node and a control message being sent from the intermediary node identifying the issue in accordance with some embodiments.

FIG. 4 illustrates an example of an offending packet 410 being received at an intermediary node 420 and a control message 430 being sent from the intermediary node 420 identifying the issue in accordance with some embodiments. Of particular importance is the addressing provided in the offending packet 410 header and the addressing provided in the control message 430 header.

The offending packet 410 header specifies the IP address and port of the distributed platform server responding to the client request as the source and the client's IP address and port as the destination. As demonstrated in this example, the source address is the Anycast address first used by the client when issuing the request to the distributed platform.

The control message 430 header specifies the IP address of the intermediary node 420 as the source and the source IP address from the offending packet 410 header as the destination. The control message 430 also includes the header of the offending packet 410 as part of its payload.

With reference back to FIG. 3A, the control message passes (at 355) from the intermediary node 310 to the core router 220. The core router 220, being stateless and having no information of the active session, performs (at 360) a hash based on the addressing of the control message to select one of the directors 230 and 235 within PoP 210 and forwards (at 365) the control message to the selected director. This is a first instance where the aberrant behavior can manifest. The change in addressing can cause the core router 220 to forward the control message to the wrong director (i.e., director 235) which has no information about the session to which the control message is directed. Even if the core router 220 forwards the control message to the appropriate director (i.e., director 230), that director will still be unable to identify the session to which the control message relates using only the addressing from the control message header. In other words, regardless of which director 230 or 235 the core router 220 forwards the control message to, that director will be unable to identify which session and, by extension, which server of the PoP 210, the control message is intended for. To resolve these issues and avoid the resulting aberrant behavior, each director 230 or 235 is configured to perform the control message header rewriting methodology presented in FIG. 5.

Figure 5:
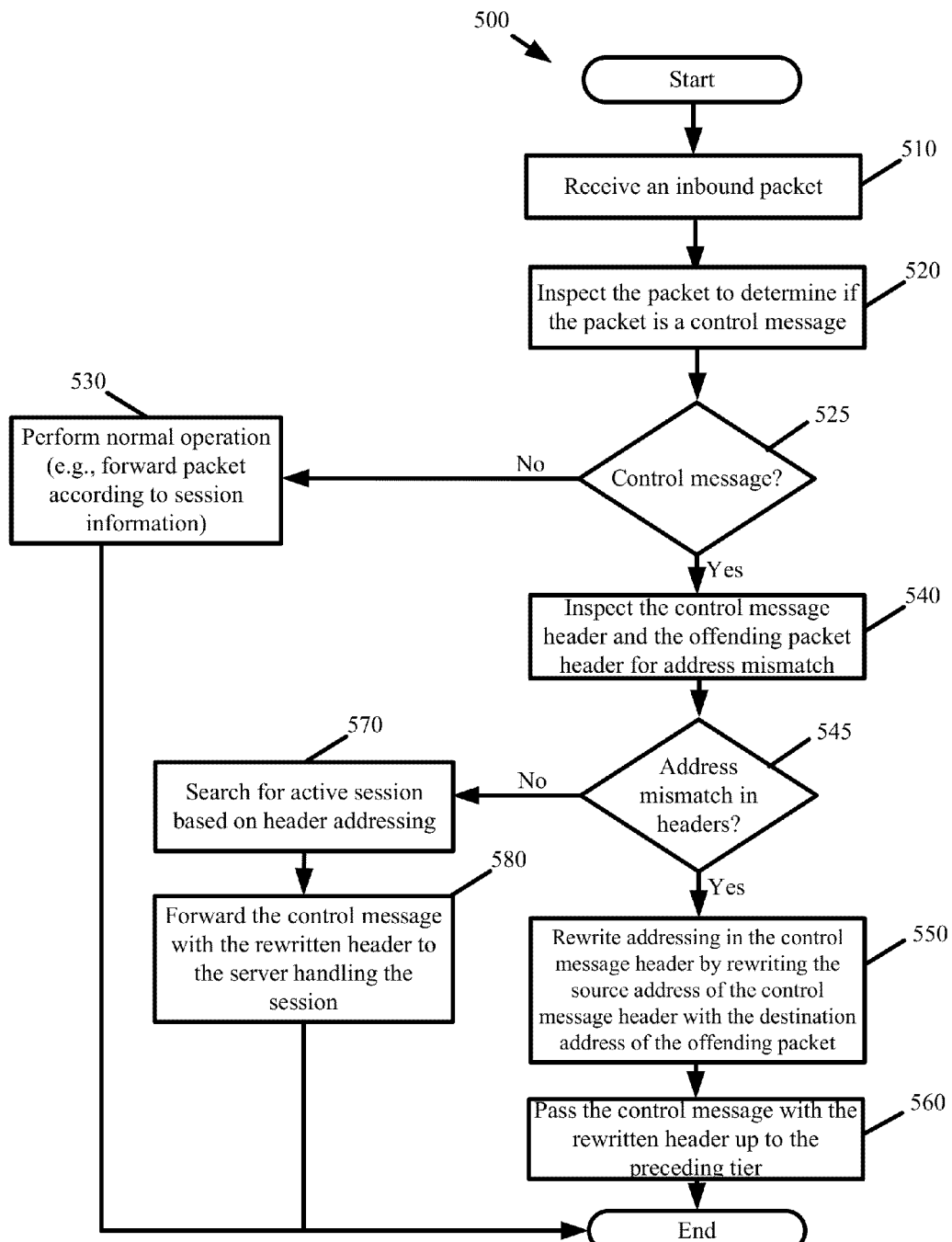
FIG. 5 presents a process presenting a series of inspections and packet rewriting operations that each director performs for each received packet in accordance with some embodiments.

FIG. 5 presents a process 500 presenting a series of inspections and packet rewriting operations that each director performs for each received packet in accordance with some embodiments. Though described with reference to performance by a director, it should be evident that process 500 can be performed by any node in any PoP of an Anycast reliant distributed platform. In other words, the core router 220 or servers 240, 245, and 250 can be configured to perform process 500 in addition to or instead of the directors 230 and 235.

The process 500 commences when the director receives (at 510) any packet from the core router or other node in or outside the corresponding PoP in which the director operates. The process causes the director to inspect (at 520) the packet to determine (at 525) if the packet is a control message. This inspection may be performed by simply looking to the port numbers from the control message header, formatting of the control message header, or the protocol used to encapsulate the packet. For example, an ICMP packet is indicative of a control message in some embodiments.

When the received packet is not a control message, the process performs (at 530) its normal operation. In the case of the director, the normal operation involves determining if a session exits for the packet or if one should be created and forwarding the packet to one of the PoP servers that is tasked with handling the session to which the packet relates.

When the received packet is a control message, the process inspects (at 540) the control message header and the offending packet header embedded within the control message. Specifically, the inspection (at 540) involves identifying (at 545) whether the source and destination address combination of the control message header differs from the source and destination address combination of the offending packet header. The difference in addressing is illustrated by the control message 430 of FIG. 4. The difference in addressing will be present in control messages that are issued by various intermediary nodes in the pathway between a client and a server or PoP of the distributed platform.

Figure 6:
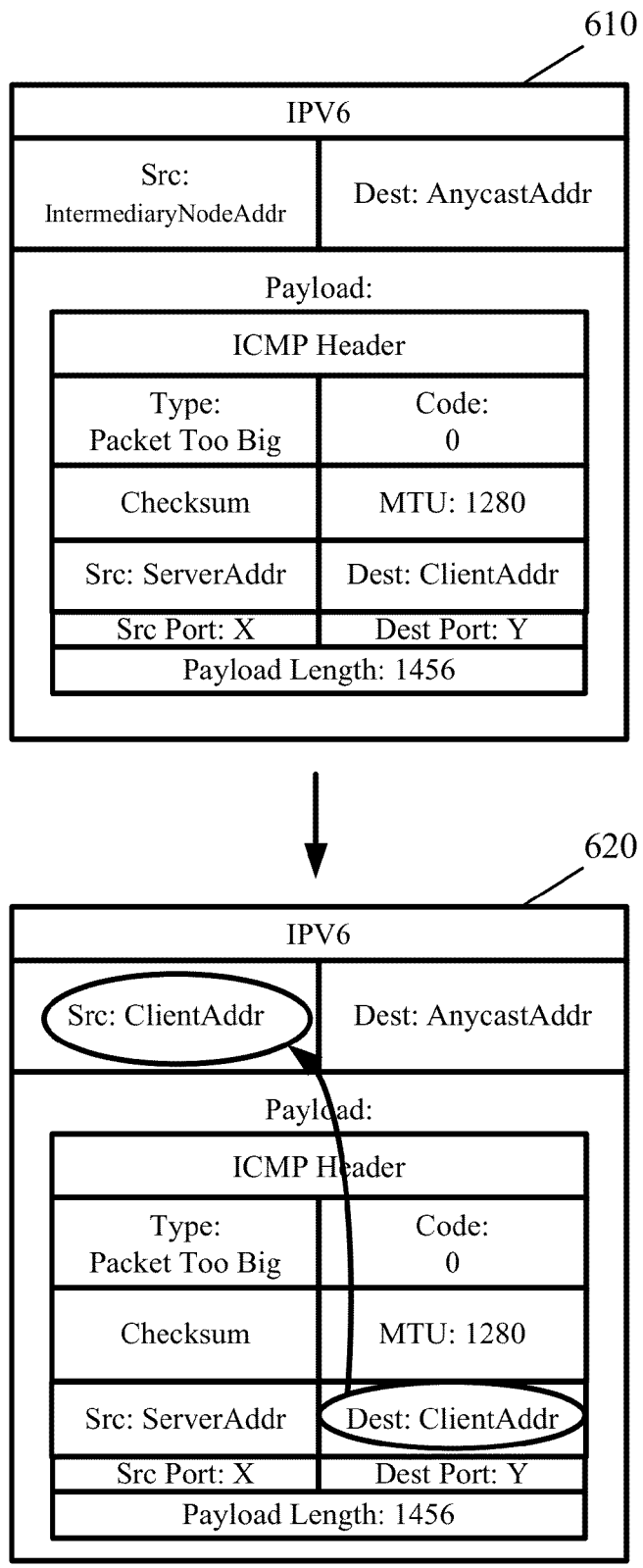
FIG. 6 illustrates a control message prior to rewriting the message header and the control message after rewriting the message header.

When the header addressing is mismatched, the process rewrites (at 550) the addressing in the control message header. This involves rewriting the source address of the control message header using the destination address of the offending packet. In some embodiments, the rewriting also involves rewriting the destination address of the control message header using the source address of the offending packet header. FIG. 6 illustrates a control message prior to rewriting the message header at 610 and the control message after rewriting the message header at 620. The process then passes (at 560) the control message with the rewritten header back up to the preceding tier of the PoP (e.g., passing from the second tier back to the first tier). In FIG. 3B, this step is illustrated at 373. Consequently, the core router 220 performs a hash using the IP addresses from the rewritten header so that the control message is forwarded to the proper director that is knowledgeable of the server handling the session to which the control message relates (i.e., director 230). At this stage the flows continues as described below when the header addressing of the control message and the offending packet is matched.

When the header addressing is matched, the process knows that a rewrite has already occurred and that no further rewrites are warranted. This prevents an endless loop of header rewriting. The process then performs (at 570) a session table lookup for the control message. In some embodiments, the session table lookup is performed using the IP addresses from the rewritten control message header and the port numbers from the offending packet header that is embedded within the control message header. The search identifies the active session that the control message is intended for and forwards (at 580) the control message with the rewritten header to the server handling the session. Some of the steps described with reference to process 500 of FIG. 5 are illustrated by steps 370-385.

Now with reference back to FIG. 3B, once the server receives the control message, it modifies (at 388) its transmission of the requested content accordingly. The control message header identifies the issue, the session involved, and optionally identifies a desired correction (e.g., lower MTU). In the message exchange of FIGS. 3A and 3B, the control message identifies that the packets being sent by the server 245 are larger than the MTU of the intermediary node 320 outgoing link and the server 245 responds by reducing the size of the packets it sends (at 390).

The packet rewriting methodology of some embodiments has thus far been described for ICMP packet too big control messages. However, the same methodology can be used to ensure that other control messages are received by the appropriate server in a PoP of an Anycast reliant distributed platform. For example, congestion control messages used in controlling Transmission Control Protocol (TCP) window sizing and window scaling.

Many of the above-described processes and components are implemented as software processes that are specified as a set of instructions recorded on a non-transitory computer-readable storage medium (also referred to as computer-readable medium). When these instructions are executed by one or more computational element(s) (such as processors or other computational elements like ASICs and FPGAs), they cause the computational element(s) to perform the actions indicated in the instructions. Server, computer, and computing machine are meant in their broadest sense, and can include any electronic device with a processor including cellular telephones, smartphones, portable digital assistants, tablet devices, laptops, notebooks, and desktop computers. Examples of computer-readable media include, but are not limited to, CD-ROMs, flash drives, RAM chips, hard drives, EPROMs, etc.

Figure 7:
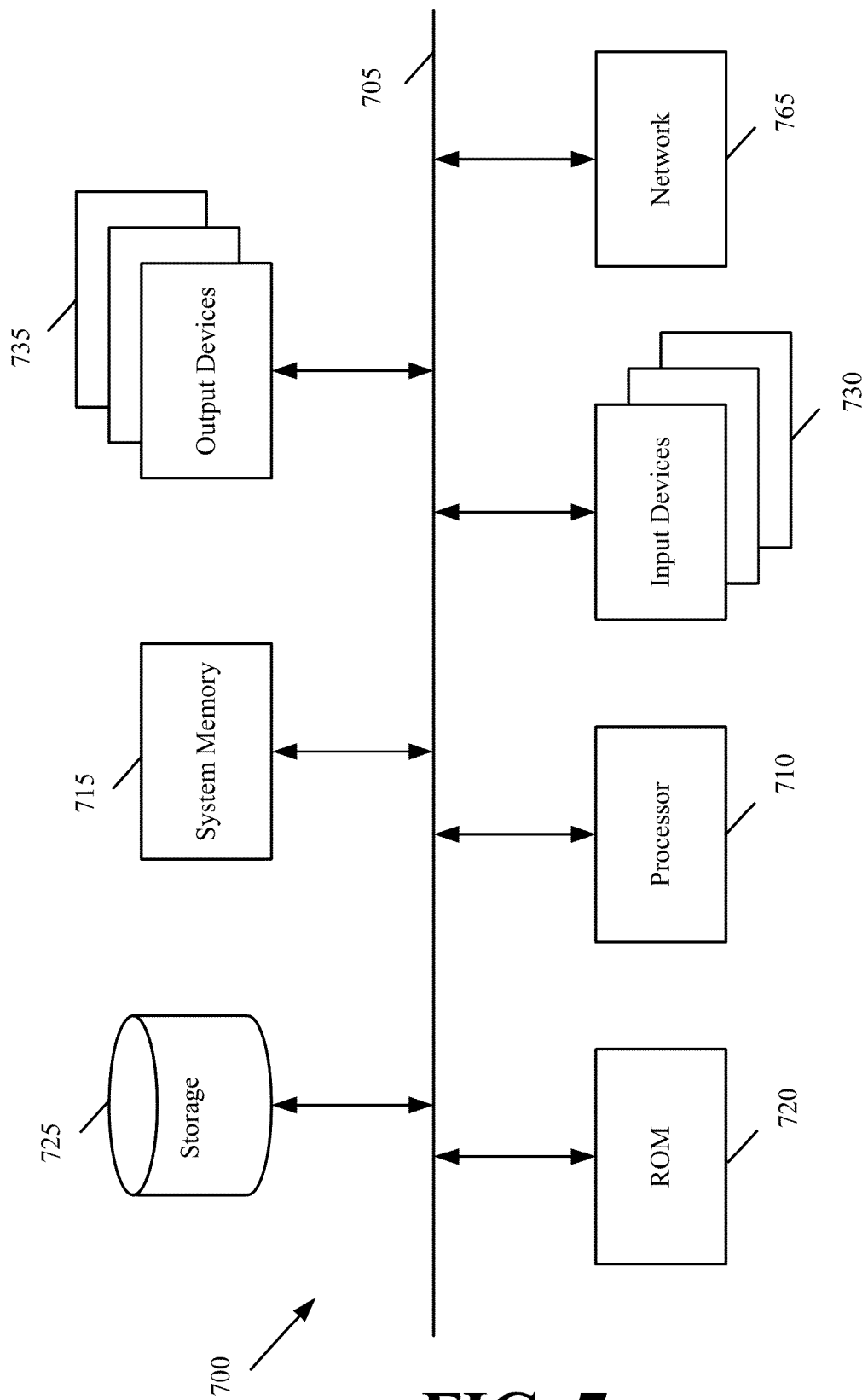
FIG. 7 illustrates a computer system or server with which some embodiments are implemented.

FIG. 7 illustrates a computer system or server with which some embodiments are implemented. Such a computer system includes various types of computer-readable mediums and interfaces for various other types of computer-readable mediums that implement the various methods and machines described above (e.g., core router, director, and server). Computer system 700 includes a bus 705, a processor 710, a system memory 715, a read-only memory 720, a permanent storage device 725, input devices 730, and output devices 735.

The bus 705 collectively represents all system, peripheral, and chipset buses that communicatively connect the numerous internal devices of the computer system 700. For instance, the bus 705 communicatively connects the processor 710 with the read-only memory 720, the system memory 715, and the permanent storage device 725. From these various memory units, the processor 710 retrieves instructions to execute and data to process in order to execute the processes of the invention. The processor 710 is a processing device such as a central processing unit, integrated circuit, graphical processing unit, etc.

The read-only-memory (ROM) 720 stores static data and instructions that are needed by the processor 710 and other modules of the computer system. The permanent storage device 725, on the other hand, is a read-and-write memory device. This device is a non-volatile memory unit that stores instructions and data even when the computer system 700 is off. Some embodiments of the invention use a mass-storage device (such as a magnetic or optical disk and its corresponding disk drive) as the permanent storage device 725.

Other embodiments use a removable storage device (such as a flash drive) as the permanent storage device Like the permanent storage device 725, the system memory 715 is a read-and-write memory device. However, unlike storage device 725, the system memory is a volatile read-and-write memory, such as random access memory (RAM). The system memory stores some of the instructions and data that the processor needs at runtime. In some embodiments, the processes are stored in the system memory 715, the permanent storage device 725, and/or the read-only memory 720.

The bus 705 also connects to the input and output devices 730 and 735. The input devices enable the user to communicate information and select commands to the computer system. The input devices 730 include alphanumeric keypads (including physical keyboards and touchscreen keyboards), pointing devices (also called "cursor control devices"). The input devices 730 also include audio input devices (e.g., microphones, MIDI musical instruments, etc.). The output devices 735 display images generated by the computer system. The output devices include printers and display devices, such as cathode ray tubes (CRT) or liquid crystal displays (LCD).

Finally, as shown in FIG. 7, bus 705 also couples computer 700 to a network 765 through a network adapter (not shown). In this manner, the computer can be a part of a network of computers (such as a local area network ("LAN"), a wide area network ("WAN"), or an Intranet, or a network of networks, such as the Internet).

As mentioned above, the computer system 700 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable blu-ray discs, any other optical or magnetic media, and floppy disks.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. A computer-implemented method for adapting legacy control messaging in a Point-of-Presence (PoP) comprising a director distributing packets across a plurality of servers, wherein the director comprises a processor, the computer-implemented method comprising:

receiving at the director, a control message that is directed to a particular server of the plurality of servers having an established session with a client, the control message comprising a first header specifying first addressing of the control message and a second header specifying second addressing of an earlier packet transmitted by the particular server;

comparing, by operation of the processor, the first addressing and the second addressing;

rewriting, by operation of the processor, the first header with the second addressing from the second header when the first addressing and the second addressing are mismatched; and passing the control message from the director to the particular server when the first addressing and the second addressing are matched, wherein said passing comprises identifying the established session to which the control message relates by hashing at least the addressing from the control message first header and forwarding the control message to the particular server.

2. The computer-implemented method of claim 1 further comprising, prior to receiving the control message, passing from the particular server to the client a first packet with a first size.

3. The computer-implemented method of claim 2 further comprising, passing from the particular server to the client a second packet with a second size that is smaller than the first size in response to the forwarding the control message to the particular server.

4. The computer-implemented method of claim 1, wherein the second header further specifies a port number comprising at least one of an application layer port number and a transport layer port number, and wherein identifying the established session is based on a hash of the addressing from the control message first header and the port number of the second header.

5. The computer-implemented method of claim 1 further comprising adjusting packets sent from the particular server to the client for said established session by reducing a payload size of the packets according to the control message.

6. The computer-implemented method of claim 1, wherein the first addressing of the control message first header specifies a first Anycast address of the PoP and a second address of an intermediary node along a path connecting the client to the particular server and the earlier packet second header specifies the first Anycast address of the PoP and a third address of the client and not the second address.

7. A method for directing control messages in a Point-of-Presence (PoP) comprising at least first and second tiers of nodes with the second tier of nodes providing at least one of content and services to clients, the method comprising:
  passing during an established session between a particular second tier node and a client, a packet addressed from a first address of the PoP to a second address of the client;
  receiving at a first tier node, a control message comprising a first header of the control message and a second header of the packet, wherein the first header specifies a third address of an intermediary node outside the PoP and the first address, and wherein the second header specifies the first address and the second address;
  reissuing the control message from the first tier node when addressing of the first header does not match addressing of the second header, wherein reissuing the control message comprises replacing the third address of the first header with the second address from the second header; and
  forwarding the control message from the first tier node to the particular second tier node as a result of performing a session lookup when the addressing of the first header matches the addressing of the second header, wherein performing the session lookup comprises identifying the established session based on a hash of at least the addressing of the control message first header.

8. The method of claim 7, wherein the packet is of a first size, the method further comprising passing a packet of a second size that is smaller than the first size from the particular second tier node to the client in response to the control message.

9. The method of claim 7, wherein reissuing the control message further comprises passing the control message after said replacing to a core router of the PoP, the core router operating to distribute packets across the first tier of nodes.

10. The method of claim 7, wherein the second header further specifies a session identifier identifying the established session between the particular second tier node and the client, and wherein performing the session lookup further comprises identifying the established session based on a hash of the addressing of the control message first header and the session identifier in the second header.

11. The method of claim 10, wherein the session identifier comprises at least one of a transport layer port number and an application layer port number.

12. The method of claim 7, wherein the control message is an Internet Control Message Protocol (ICMP) packet too big message.

13. The method of claim 7 further comprising receiving at the first tier node, a request from the client specifying the first address, the second address, and a port number comprising at least one of an application layer port number and a transport layer port number.

14. The method of claim 13 further comprising selecting the particular second node from the second tier of nodes for said session based on the first address, the second address, and the port number from the request and forwarding the request to the particular second tier node.

15. The method of claim 14 further comprising creating said session in a session table of the first tier node, wherein a session identifier associated with the session is based on the first address, the second address, and the port number.

16. The method of claim 15, wherein the second header of the packet specifies the port number, and wherein said forwarding is further based on a hash of the port number from the second header of the packet.

17. The method of claim 7, wherein the first address is an Anycast address usable in reaching any of the second tier nodes.

18. A system comprising:
  a plurality of first tier nodes engaged in a plurality of active sessions with a plurality of clients, wherein a particular active session between a particular first tier node and a particular client involves transmission of at least one of content and services from the particular first tier node to the particular client;
  a second tier node configured to:
    (i) reissue a control message comprising a first header of the control message specifying an address of an intermediary node in a path connecting the particular client to the particular first tier node and a second header of an earlier packet passed from the particular first tier node specifying an address of the particular client, wherein reissuing the control message comprises replacing the intermediary node address in the first header with the particular client address from the second header, and
    (ii) forwarding the control message node to the particular first tier node as a result of performing a session lookup when the addressing of the first header matches the addressing of the second header, wherein performing the session lookup comprises identifying the particular active session based on a hash of at least the addressing of the control message first header.

19. The system of claim 18 further comprising a third tier node receiving packets directed to any of the plurality of first tier nodes, the third tier node distributing said packets to the second tier node for identification of a session to which each packet relates.

20. The system of claim 18, wherein the second header further specifies at least one port number, and wherein performing the session lookup further comprises identifying the particular active session based on a hash of the port number.

* * * * *